United States Patent
Borehag

[15] 3,661,348
[45] May 9, 1972

[54] SUPPORTING MEANS FOR ELEVATABLE AIRCRAFT NET BARRIERS

[72] Inventor: Leif Mathias Borehag, Norrkoping, Sweden

[73] Assignee: Borgs Fabriks AB, Norrkoping, Sweden

[22] Filed: Nov. 5, 1970

[21] Appl. No.: 87,099

[30] Foreign Application Priority Data

Nov. 14, 1969 Sweden................................15,626/69

[52] U.S. Cl. ....................................................244/110 C
[51] Int. Cl. ............................................................B64c 25/68
[58] Field of Search ...............................244/110 C, 110 R

[56] References Cited

UNITED STATES PATENTS 3,530,959 9/1970 Kopp.................................244/110 C
3,578,271 5/1971 Thompson.........................244/110 C Primary Examiner—Trygve M. Blix
Attorney—Munson & Fiddler

[57] ABSTRACT

An arrangement for supporting an elevatable aircraft barrier net comprising a supporting means consisting of a convex arcuate structure consisting of at least one or more inflated gas or air-filled tubes to which a barrier net is attached, the tubes when inflated raising into an arcuate support for the net, causing the central portion of the net, or that part which is contacted by the aircraft, to be brought to a position where it is then the highest portion of the net.

8 Claims, 6 Drawing Figures

INVENTOR.
Leif Mathias Borehag
BY
Eric Y Munson
ATTORNEY

INVENTOR
Leif Mathias Borehag
BY Eric Y. Munson
ATTORNEY

3,661,348

SUPPORTING MEANS FOR ELEVATABLE AIRCRAFT NET BARRIERS

BACKGROUND OF THE INVENTION

It is known to support aircraft net barriers on collapsible stanchions, between which the net, when raised, is suspended on a line which extends between the stanchions. Owing to the parabolic form adopted by the line, the shortest distance between the surface of the ground and the line is obtained with this arrangement, at the center of the net, where the aircraft is likely to contact. It would be more desirable if the aircraft was caught at the highest point of the net rather than at a lower point. A further disadvantage is that the metal stanchions and the steel line supported thereby are liable to damage the aircraft, if the aircraft engages the net to one side of the center. This can easily happen. These and other disadvantages are eliminated by means of the present invention, which relates to a novel support means for the barrier net structure.

In the accompanying drawing, wherein an illustrative embodiment of the invention is disclosed, FIG. 1 is a perspective view of an arrangement made in accordance with the invention;

FIGS. 2, 3 and 4 shown sections along the lines II—II, III—III and IV—IV respectively, in FIG. 1;

Figure 1:
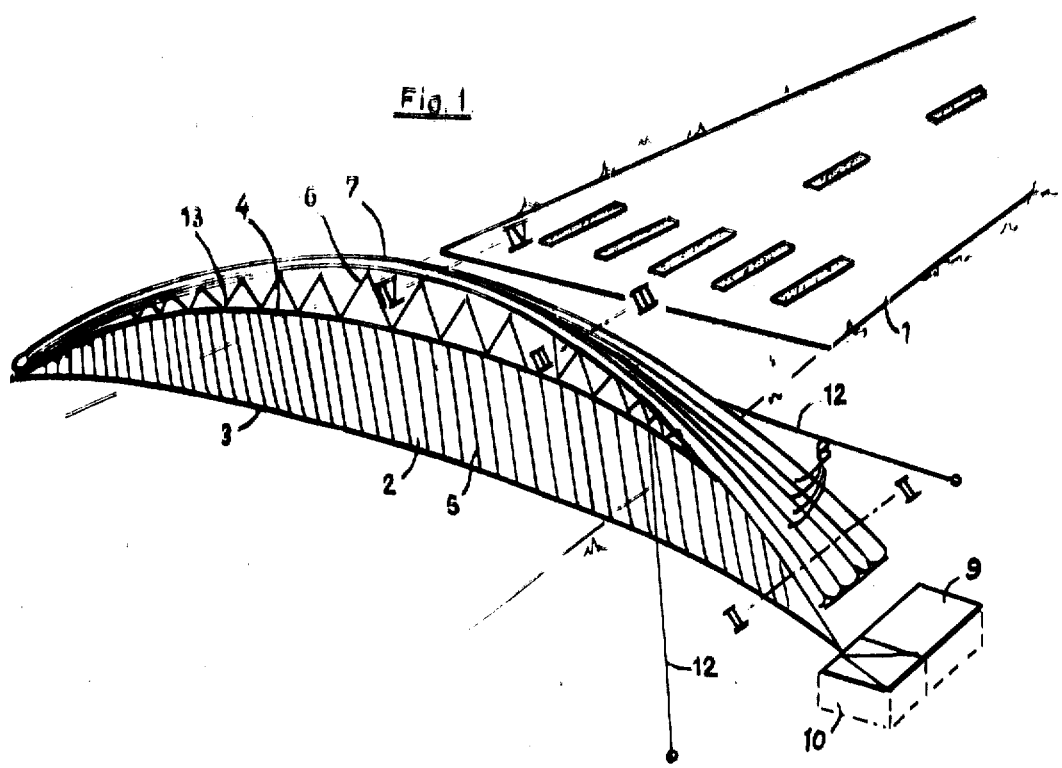
Figure 2:
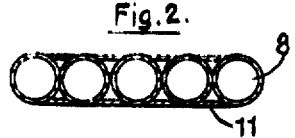
Figure 3:
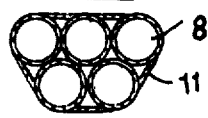
Figure 4:
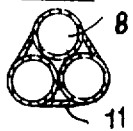

In FIG. 1 of the drawing an aircraft runway is shown at 1. Located at one end of the runway is a barrier net 2. The net comprises top and bottom lines 3 and 4 with lines 5 extending vertically therebetween. The net is suspended in a convex arcuate structure 7 by means of a support line system 6.

The arcuate structure 7 consists of arcuate gas-filled tubes 8 composed of a material of a flexible nature and which may be a gas-tight synthetic rubber mounted on fabric wrapped in a wear-resisting and strengthening shield of flexible material such as synthetic fabric and synthetic tape.

When the net is to be raised, gas or air under pressure above atmospheric pressure, is fed into the tubes 8 from an accumulator or gas generator 9. The arcuate structure is then elevated and it assumes the arched position shown in FIG. 1. When it is desired to lower the net, the gas is drained from the tubes, whereupon the arcuate structure collapses and lies on the ground.

The tubes 8 have a mutual pattern of orientation and are connected by a flexible material 11 for taking up shear and tension forces. As will be seen from FIG. 1, the tubes are so arranged that the center portion of the arcuate structure has a vertical thickness which is greater than the horizontal width of said structure at the base portions thereof. The arcuate structure is braced against lateral forces by means of lines 12 anchored in the ground and attached to the arcuate structure by means of shear devices arranged to fracture when an aircraft collides with the net. The base ends of the arcuate structure are also anchored to the ground by means of shear devices.

The support line system has a number of shear devices 13 between it and the upper portion of the net. These shear devices provide a large total lifting force when the net is raised and they shear one by one in series when an aircraft is arrested by the net. In this way the aircraft is not subjected to extra loads from the suspension. A brake is indicated at 10.

Instead of obtaining the required gas from a gas generator, it may be obtained pyrotechnically or by any other known means.

With the arrangement of the invention, the net is highest at that point, or at its central part, where it is struck by the aircraft, and this is desirable. There are no metal stanchions or steel lines which can damage the aircraft. Because the sheer devices of the net suspension system, tend to shear one at a time or in series, the aircraft is not subjected to harmful loads from the suspension system, and the system has numerous advantages to it which will be apparent to those skilled in this art.

While a number of the tubes are shown in side-by-side relation, it will be apparent that one or more of them can be used without departing from the spirit of the invention.

Figure 5:
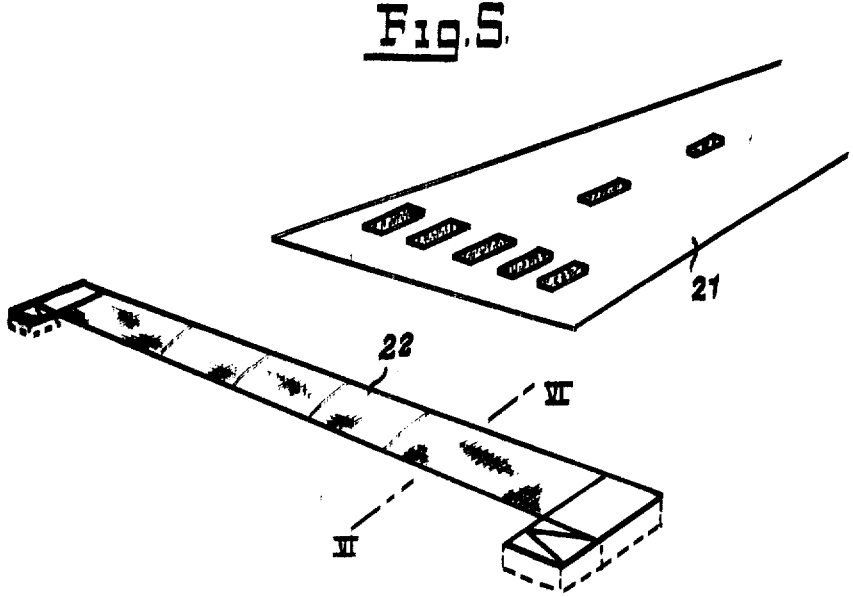
FIG. 5 is a perspective view of an arrangement employing a covering mat.
Figure 6:
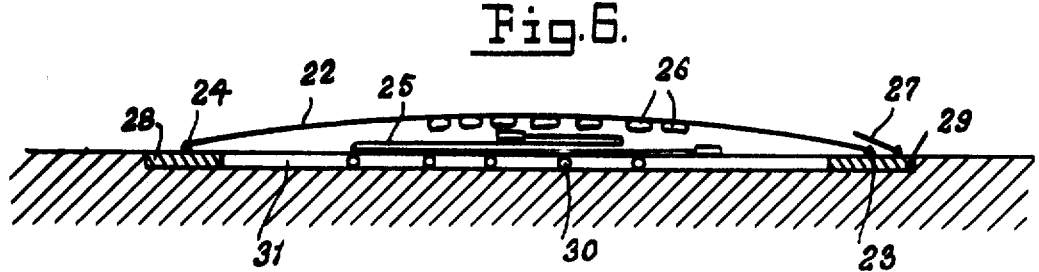
FIG. 6 is a sectional view taken substantially on the line VI—VI of FIG. 5.

In the embodiment shown in FIGS. 5 and 6, a runway for airplanes is shown at 21. At one end is a barrier net which in FIG. 5 is shown as being collapsed beneath a mat 22. The mat is fastened along its longitudinal sides, and possibly along its transverse sides, in the ground by means of suitable fastening devices. Such fastening means is shown at 23 and 24, and may be breakable so that they break when the net is raised, or a release lock may be provided which is released when the barrier net is raised. The mat 22 protects the net and also the supporting system if the latter is located beneath the mat, from the effect of weather as well as against the jet streams emanating from the taking off and landing planes.

FIG. 6 shows a net 25 folded in zig-zag formation beneath the mat 22. A supporting system of elastic pipes or tubes shown at 26 is filled with pressurized gas or fluid to raise the net.

The fastening means shown at 23 and 24 are so constructed that when the net is raised normally, only the means 24 at the rear longitudinal side, with reference to the folding direction, frees the mat from the ground. The net therefore, will still be attached to the ground by means of the fastening means 23 when the net is raised. The object is to protect the lower lines of the net during passage by the nose of the airplane. In order to protect this longitudinal side with its fastening means 23 an edge protector 27 is attached to the ground and which overlies the edge of the mat and the fastening means. The fastening means are so adjusted that they remain in locking position under the effect from the jet streams, which produce an evenly divided effect along the entire mat, but the fastening means are released when the net is raised which begins at the middle portion of the mat. Draining panels are shown at 28 and 29 and between them are shown heating cables 30 in a ditch or trench 31, in order to prevent condensation and frost formation beneath the mat 22. The met and its supporting system, while in the stored position, have a substantially greater width than thickness in vertical direction. As will be seen from FIG. 1, the thickness is greatest at the middle portion in order to decline towards the longitudinal sides.

What is claimed is:

1. An arrangement for supporting an elevatable aircraft barrier net comprising, a supporting means for the net consisting of a convex arcuate structure consisting of at least one gas tube which is arcuate in shape when the net attached to it is raised, said tube being composed of a flexible material for supporting the net, and means for filling the tube with a fluid under pressure to cause said tube to assume an arcuate shape.

2. An arrangement according to claim 1, wherein the net support comprises a plurality of the gas tubes arranged in side by side relationship and flexibly united.

3. An arrangement according to claim 1, wherein there is a plurality of the gas tubes made of a gas tight, fabric backed synthetic rubber or the like, which tubes are enveloped in a tubular wear-resisting and strengthening shield of a flexible material such as a synthetic fabric or synthetic tape.

4. An arrangement according to claim 1, wherein the gas tubes have a mutual pattern of orientation, which varies from the top to the foot of the arch formed by the tubes, said tubes being connected to a flexible material for taking up shear and tension forces.

5. An arrangement according to claim 1, wherein the arcuate tube structure when raised, has a vertical thickness at the center thereof greater than its horizontal width at its base ends.

6. An arrangement according to claim 1, wherein the arcuate tube structure is braced laterally by means of lines anchored in the ground and attached to the tube structure by means of shear devices.

7. An arrangement according to claim 1, wherein the net is anchored at the base ends of it by means of shear devices which will shear when an aircraft collides with the net.

8. An arrangement according to claim 1, wherein the net is suspended from the arcuate tube structure by means of a support line system attached to shear devices, which shear devices will shear when an aircraft collides with the net.

* * * * *